United States Patent
Blevins

(10) Patent No.: US 6,327,782 B1
(45) Date of Patent: Dec. 11, 2001

(54) GRASS AND WEED CUTTER CONSTRUCTION

(76) Inventor: David L. Blevins, 288 Cripple Creek Loop, Watauga, TN (US) 37694

( * ) Notice: Subject to any disclaimer, the term of this patent is extended or adjusted under 35 U.S.C. 154(b) by 0 days.

(21) Appl. No.: 09/545,798

(22) Filed: Apr. 8, 2000

(51) Int. Cl.7 .............................. A01D 34/47; A01D 34/82
(52) U.S. Cl. ................................. 30/276; 30/286; 30/347; 56/17.4
(58) Field of Search ............................. 30/276, 286, 347; 56/17.4, 12.7, 320.1, DIG. 24; 172/13, 15; D8/8; D15/17

(56) References Cited

U.S. PATENT DOCUMENTS

| | | | | |
|---|---|---|---|---|
| 2,706,941 | * | 4/1955 | Swanson | 172/15 |
| 3,006,421 | * | 10/1961 | Feilbach | 56/17.4 |
| 5,077,898 | * | 1/1992 | Hartwig | 30/276 |
| 5,423,126 | * | 6/1995 | Byrne | 30/276 |
| 5,924,205 | * | 7/1999 | Sugihara et al. | 30/276 |
| 5,940,973 | * | 8/1999 | Kitz | 30/276 |

* cited by examiner

*Primary Examiner*—Hwei-Slu Payer

(57) ABSTRACT

An implement for cutting grass or weeds or the like wherein a Weedeater type cutting head is provided on which a cutting line or blade or the like cutting element is mounted for rapid whirling motion, wherein protective shielding is provided on the implement and interposed between the cutting element and the normal position of the operator, and a skirt-like mat of tough, resilient, flexible plastic filaments are provided on the implement for extending downwardly toward and preferably into contact with a terrain surface when the implement is in its operative posture, the filaments being sufficiently flexible to readily conform to the terrain surface when brought into contact therewith to thereby afford greatly enhanced protection against flying debris while providing substantially unhindered freedom of motion to the cutting head.

12 Claims, 2 Drawing Sheets

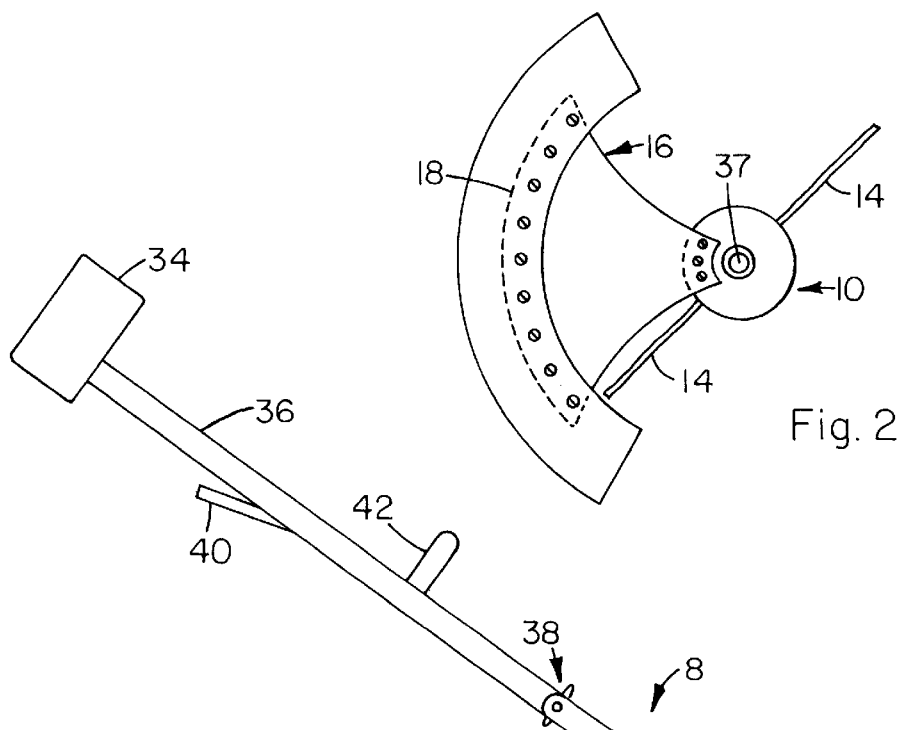
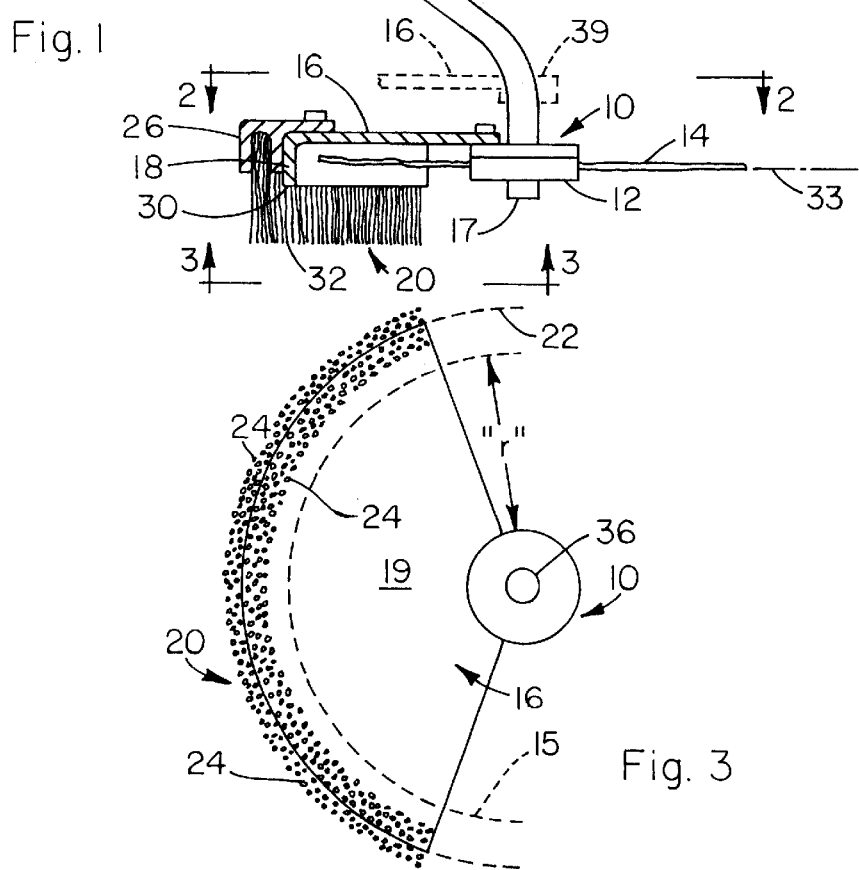

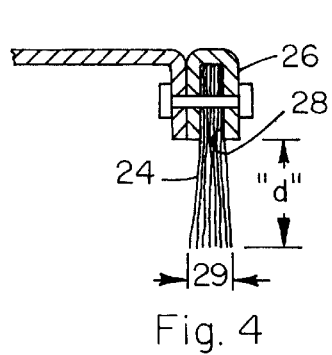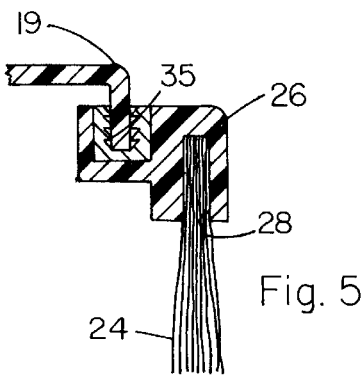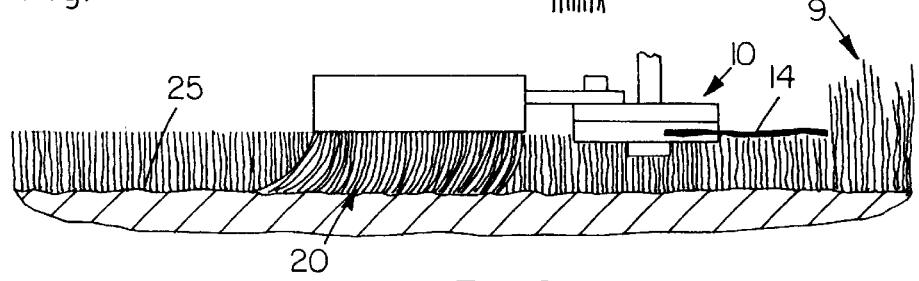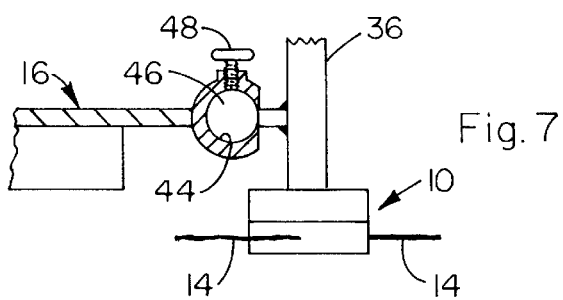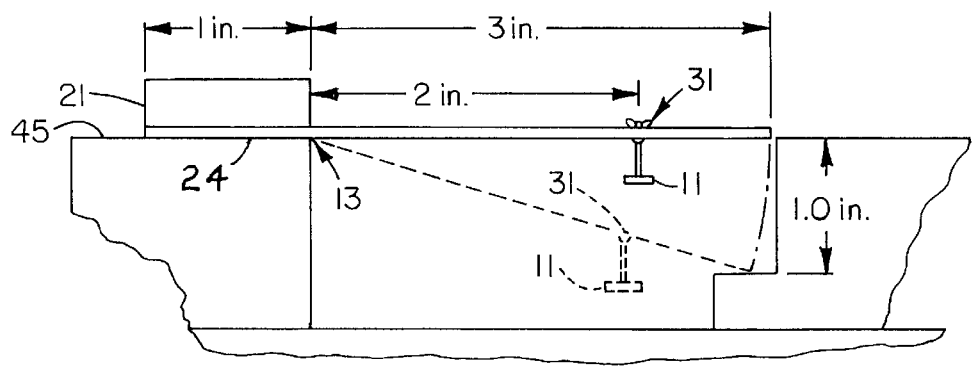

GRASS AND WEED CUTTER CONSTRUCTION

BACKGROUND OF THE INVENTION

Field

This invention concerns grass and weed cutting or trimming implements of the type commonly known as Weedeater® wherein a whirling Nylon or the like line or string, or a rigid blade provides the cutting element. Such implements are typically powered by electric motors, house current or battery powered, or gasoline powered engines and the line cutter types are fitted with string feed-out and cut-off devices which provide the proper length to the string either by manual or automatic actuation. Such implements are shown, for example, in U.S. Pat. Nos.: 2,583,113; 3,174,224; 3,306,015; 3,378,995; 3,453,732; 4,987,681; 5,010,720; 5,115,870; 5,279,100; 5,423,126; 5,524,349; 5,584,348; 5,924,205 the disclosures of which are hereby incorporated herein by reference. The present invention particularly concerns shielding for mounting on such implements for the protection of the users or bystanders against flying debris such as pebbles or stick pieces thrown out by the cutting element with damaging force.

Prior Art

Various protective shielding for such implements have been developed and include those shown in the aforementioned U.S. patents and GRAINGER catalog. These shieldings have been found to afford only limited usefulness however, because of one or more factors such as their cumbersomeness, structural weight and complexity, the hindrance they give to free motion of the cutting head when the shielding is brought into contact with the terrain, and the inherent danger of debris rebounding from rigid shielding.

OBJECTS OF THE INVENTION

Objects therefore of the present invention are: to provide a shielding for such implements which can be provided on original, factor produced cutting implements or adapted for retrofitting existing cutting implements and which allows near complete freedom of motion to the cutting head while affording markedly improved protection against flying debris; and to provide such shielding as an inexpensive and easy to install item.

SUMMARY OF THE INVENTION

The above and other objects have been attained in accordance with the present invention which is summarized as an implement for cutting grass or weeds or the like wherein a Weedeater type cutting head is provided on which a cutting line or blade or the like cutting element is mounted for rapid whirling motion, and wherein protective shielding is provided on the implement and interposed between the cutting element and the normal standing position of the operator, and a skirt-like mat of tough, resilient, flexible plastic filaments are provided on the shielding for extending downwardly therefrom toward and preferably into contact with a terrain surface when the implement is in its operative posture, said filaments being sufficiently flexible to readily conform to the terrain surface when brought into contact therewith to thereby afford greatly enhanced protection against flying debris while providing substantially unhindered freedom of motion to the cutting head.

BRIEF DESCRIPTION OF THE DRAWINGS

The invention will be further understood from the drawings and description herein, wherein the figures are not to scale and certain structural portions are enlarged or broken away for clarity, and wherein:

FIG. 1 is a side view of a cutting implement with the present protective shielding shown in cross-section and mounted on the housing portion of the cutting head;

FIG. 2 is a top view taken in the direction of line 2—2 in FIG. 1 in the direction of the arrows;

FIG. 3 is a bottom view taken in the direction of line 3—3 in FIG. 1 in the direction of the arrows;

FIGS. 4 and 5 are cross-sectional views of an edge portion of the present shielding showing variations of the mat mounting structure.

FIG. 6 is a side view of the present shielding of FIG. 1 showing the mat filaments engaging the terrain partially broken away view of the implement of FIG. 1;

FIG. 7 is a side view, partially in section, of a universal joint mounting structure for the present shielding structure; and FIG. 8 is a side view of the apparatus for determining the flex modulus of the filaments.

DETAILED DESCRIPTION OF THE DRAWINGS

Referring to the drawings and with particular reference to the claims hereof; the present invention comprises a cutting or trimming implement generally designated 8 for grass or weeds 9 or the like and having a cutting head means 10 of any type and provided with a driven rotatable member 12 such as a stub shaft or line feeding spool on which a cutting element such as one or more monofilament synthetic plastic lines 14 is mounted for rapid whirling motion with member 12 in a cutting path 15. As is conventional, a bounce button 17 can be provided on the rotatable member 12 to automatically feed cutting line when the button is bounced on the terrain surface. A protective shield such as 16 is mounted on the implement and has the periphery 18 of its body portion 19 extending partly or all the way around the cutting path. A skirt-like protective structure 20 is provided on the shield body outboard of the radius "r" of the cutting path and lies generally along a protection arc line 22 and comprises a mat 23 of filaments 24 extending downwardly from the shield body a protective distance "d".

These filaments 24 are preferably plastic monofilaments of, e.g., Nylon, Teflon, polypropylene, polyethylene, PVC or the like and are sufficiently resilient, tough and flexible to readily conform to practically any terrain surface 25 to thereby afford protection against flying debris while providing substantially unhindered freedom of motion to said cutting head. Most preferred monofilaments are Nylon, polyethylene or polypropylene having a diameter of from about 0.5 mm to about 1.5 mm and a flex modulus of from about 0.03 to about 0.10 ounces. The flex modulus is a fairly accurate approximation and depends mostly on the filament diameter and chemical composition and is equal to the weight in ounces required to flex at 70° F., a filament overhang of three inches downwardly one inch wherein the weight connection or thread tie 31 to the filament overhang is at a point two inches from the fulcrum 13. An example of the test mechanics and procedure is shown in FIG. 8. This procedure comprises the steps of placing a one inch long inner end portion of the filament on a base surface 45 and placing a hold down block 21 on the filament to hold the filament in the position shown by the heavy black line in FIG. 8. Weights 11 are added to the filament two inches from the fulcrum until the filament outer end bends down one inch as shown by the dotted curved line in FIG. 8. As an example, the modulus is approximately about 0.07 oz., for a polypropylene filament having a diameter of about one mm.

The monofilament mat 20 and its support means may comprise a variety of structures, examples of which are shown in FIGS. 4 and 5 wherein the support means is shown in cross-section and comprises a rubber or elastomeric, e.g., auto tire or drive belt composition attachment band 26 formed to provide a slot 28 into which end portions or bent mid-sections of the filaments, preferably monofilaments 24 are crammed and adhesively bonded to each other and to the walls of slot 28. The filaments are preferably arranged in a random pattern, of e.g., from about 4 to about 10 visible monofilaments on the average per random cross-section 29 of mat 20 to give the best protective results and desired resistance to sliding movement of the mat across the terrain 25. Put another way, the filament density preferably is from about 60 to about 120 filaments per inch of band length. The band 26 with the monofilaments attached may be manufactured in strip form and then cut to the length desired, preferably such as required to extend the full length of the shield body periphery 18, or beyond for added protection as shown in FIG. 2. The support means of FIG. 5 utilizes a jagged toothed metal insert, either in strip form or segments, whereby the support band 26 can be quickly pushed up onto the shield body flange or edge 30 whereby the teeth 35 bite into the shield and prevent dislodging of the band 26 therefrom.

The length "d" of the monofilaments is partially determined by the distance of the lower edges 30 of the shield from the terrain 25 during normal use. It is preferred, for example, that where the cutting element in operation is about one inch to about two inches above ground level, the bottom ends 32 of the filaments are at least at ground level, and most preferably would be from about one half inch to about 1.5 inches below ground level were the filaments not bent by contact with the terrain as shown in FIG. 6.

It is particularly noted that by virtue of the preferred combination of the filaments extending below the cutting plane 33, most preferably of a total length of from about 2 to about 8 inches, the random arrangement and density of the filaments, and the flexibility and resiliency of the filaments, the present protective shielding can absorb all the kinetic energies of practically any debris flung generally laterally outwardly against the mat, with essentially no rebound of the debris.

The present shielding and its mounting structure can be adapted to any shape or size of cutting implement or their as-manufactured shielding and, e.g., can be mounted on handle 36 by suitable bracket means 39 as shown by the dotted outline in FIG. 1. The cutting implement can be flexible or rigid and includes (a) plastic line, (b) metal wire, (c) metal cable, (d) metal blade, or (e) plastic blade. Also, such implements can be powered by motors or engines such as 34 of any type either mounted adjacent to or on the cutting head housing or remotely mounted, e.g., on the implement handle 36 as in FIG. 1 wherein rotating power to the head is transmitted by a drive shaft or drive cable or the like 37 in the handle.

Further, handle 36 may be provided with a power trigger 40, stabilizer handle bar 42 and an adjustable joint means 38, either single plane up or down or universal, for changing the angle of the cutting line with respect to the handle whereby the user can operate the implement in a more comfortable position and wherein the present protective mat is angled at its most effective posture. In a preferred embodiment as shown in FIG. 7 the present shield may be provided with a ball socket 44 universally slidably mounted on a ball 46 and fixed to handle 36 or to head means 10 for allowing the shield 16 to be oriented at any angle desired with respect to the terrain surface or to the cutting plane 33. A thumbscrew 48 or the like is provided to fix the ball in position within the socket. The position of the ball and socket may, of course, be reversed.

This invention has been described in detail with particular reference to preferred embodiments thereof but it will be understood that variations and modifications will be effected within the spirit and scope of the invention.

I claim:

1. An implement for cutting grass or weeds from a terrain surface wherein a cutting head means is mounted on handle means, said head means being provided with driven rotatable means, a cutting element mounted on said rotatable means for rapid whirling motion therewith, protective shield means mounted on said implement and having a periphery which extends partly or all the way around a cutting path of said cutting element, and a skirt protective mat of filaments mounted on said shield means and extending partly or the full length of said periphery and downwardly therefrom a protective distance toward a terrain surface in normal use, said filaments being sufficiently flexible and resilient to readily conform to said terrain surface when brought into contact therewith to thereby afford markedly enhanced protection against flying debris while providing substantially unhindered freedom of motion to said cutting head means and said cutting element.

2. The implement of claim 1 wherein said cutting element is flexible or rigid and is selected from the group consisting of (a) plastic line, (b) metal wire, (c) metal cable, (d) metal blade, or (e) plastic blade.

3. The implement of claim 1 wherein said shield means is mounted on said head means.

4. The implement of claim 1 wherein said shield means is mounted on said handle means.

5. The implement of claim 1 wherein said shield means is mounted on said handle means by adjustable pivot means whereby an operator can adjust the orientation of said shield means and said mat with respect to the terrain surface.

6. An implement for cutting grass or weeds from a terrain surface wherein a cutting head structure is mounted on one end portion of an elongated handle and is provided with a driven rotatable member, a cutting element mounted on said member for rapid whirling motion therewith, a protective shield mounted on said implement and having a periphery which extends partly or all the way around a cutting path of said cutting element, and a skirt protective mat of filaments mounted on said shield on peripheral portions thereof and extending a desired length of said periphery or therebeyond and downwardly therefrom a protective distance toward the terrain surface in normal use of said implement, said filaments being sufficiently tough, flexible and resilient to readily conform to said terrain surface when brought into contact therewith to thereby afford markedly enhanced protection against flying debris while providing substantially unhindered freedom of motion to said cutting head structure and said cutting element.

7. The implement of claim 6 wherein said cutting element is flexible or rigid and is selected from the group consisting of (a) plastic line, (b) metal wire, (c) metal cables, (d) metal blade, or (e) plastic blade.

8. The implement of claim 6 wherein said shield is mounted on said head structure.

9. The implement of claim 6 wherein said shield is mounted on said handle.

10. The implement of claim 6 wherein said shield is mounted on said implement by adjustable pivot means whereby an operator can adjust the orientation of said shield and said mat with respect to the terrain surface.

11. The implement of claim 6 wherein drive motor means is mounted on the other end portion of said handle and power transmission means extends thru a bore thru said handle and connects output shaft means of said motor means with said driven rotatable member for rotating said rotatable member.

12. The implement of claim 6 wherein said shield is affixed to said handle above the cutting head structure.

* * * * *